US011072337B2

(12) United States Patent
Hagenlocher et al.

(10) Patent No.: US 11,072,337 B2
(45) Date of Patent: Jul. 27, 2021

(54) METHOD FOR ASCERTAINING THE COEFFICIENT OF FRICTION BETWEEN A VEHICLE WHEEL AND THE ROADWAY

(71) Applicant: Robert Bosch GmbH, Stuttgart (DE)

(72) Inventors: Nils Hagenlocher, Stuttgart (DE); Raphael Wenzel, Burkardroth (DE); Tobias Oberhardt, Erlenbach (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 16/222,544

(22) Filed: Dec. 17, 2018

(65) Prior Publication Data

US 2019/0210606 A1 Jul. 11, 2019

(30) Foreign Application Priority Data

Jan. 8, 2018 (DE) .......................... 102018200180.4

(51) Int. Cl.
*B60W 40/068* (2012.01)

(52) U.S. Cl.
CPC ....... *B60W 40/068* (2013.01); *B60W 2720/28* (2013.01); *B60W 2720/30* (2013.01)

(58) Field of Classification Search
CPC .......... B60W 40/068; B60W 2720/28; B60W 2720/30
See application file for complete search history.

(56) References Cited

U.S. PATENT DOCUMENTS

| 2006/0015236 A1* | 1/2006 | Yamaguchi | B60T 8/1769 701/69 |
| 2007/0012538 A1* | 1/2007 | Katakura | F16H 61/061 192/3.61 |
| 2010/0055649 A1* | 3/2010 | Takahashi | B60W 40/09 434/66 |

FOREIGN PATENT DOCUMENTS

| DE | 102012206228 A1 | 10/2013 |
| DE | 102013227083 A1 | 6/2015 |

OTHER PUBLICATIONS

Friction Equation (https://web.archive.org/web/20140218145910/http://hyperphysics.phy-astr.gsu.edu/hbase/frict.html) (Year: 2014).*
Static and Kinetic Friction (https://web.archive.Org/web/20140420184810/http://ffden-2.phys.uaf.edu/211_fall2002.web.dir/ben_townsend/staticandkineticfriction.htm) (Year: 2014).*

* cited by examiner

*Primary Examiner* — Ig T An
(74) *Attorney, Agent, or Firm* — Norton Rose Fulbright US LLP; Gerard Messina

(57) ABSTRACT

In a method for ascertaining the coefficient of friction between a vehicle wheel and the roadway, at least one active vehicle unit influencing the longitudinal dynamics of the vehicle is controlled during the trip in such a manner, that the longitudinal wheel force acting upon at least one vehicle wheel is increased, and/or the contact patch force of the wheel is decreased, while the characteristic of the sum of all of the longitudinal forces acting upon the vehicle remains unchanged.

14 Claims, 1 Drawing Sheet

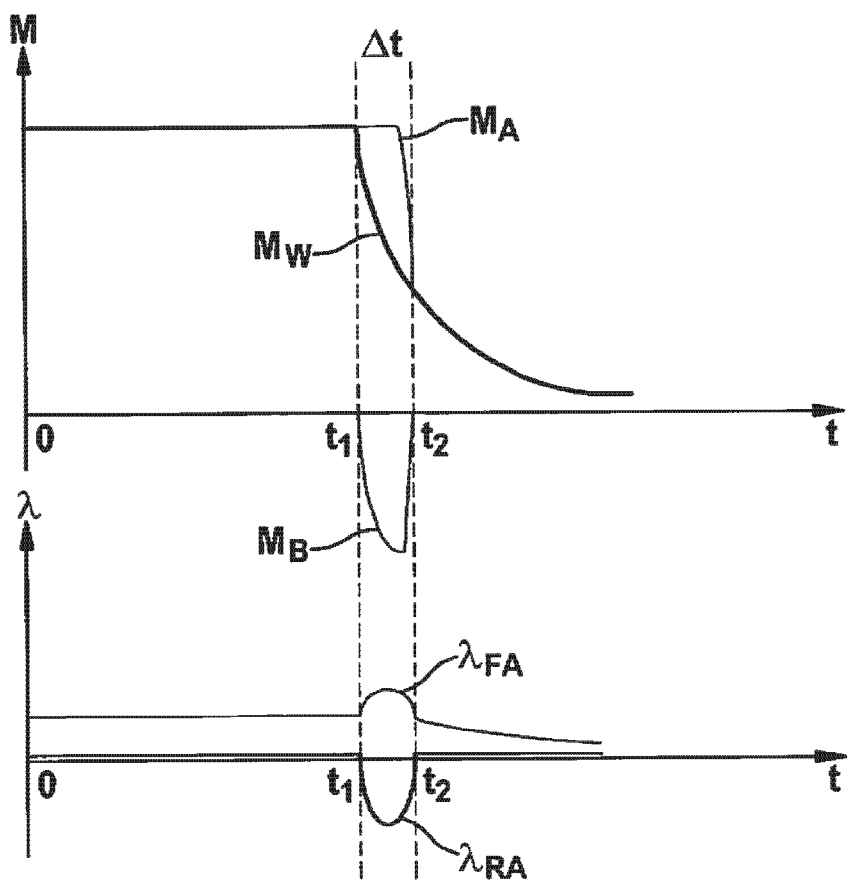

METHOD FOR ASCERTAINING THE COEFFICIENT OF FRICTION BETWEEN A VEHICLE WHEEL AND THE ROADWAY

CROSS REFERENCE

The present application claims the benefit under 35 U.S.C. § 119 of German Patent Application No. DE 102018200180.4 filed on Jan. 8, 2018, which is expressly incorporated herein by reference in its entirety.

FIELD

The present invention relates to a method for ascertaining the coefficient of friction between a vehicle wheel of a vehicle and the roadway, on which the vehicle travels.

BACKGROUND INFORMATION

German Patent Application No. DE 10 2012 206 228 A1 describes a method for ascertaining a coefficient of friction, where a warning jerk is automatically generated via actuation of the brake system, in order to indicate an imminent risk of collision; an estimation of the coefficient of friction of the roadway being made by evaluating the driving dynamics during the warning jerk. The coefficient of friction is ascertained at the time of implementing the warning jerk and is based on the evaluation of the wheel slip.

German Patent Application No. DE 10 2013 227 083 A1 describes a method for ascertaining the coefficient of friction between the vehicle wheel and the roadway, where the coefficient of friction is put into friction coefficient classes of different magnitudes as a function of current driving situations, and the friction coefficient classification is assigned a probability for different driving situations. This allows the coefficient of friction to be roughly subdivided into different friction coefficient classes.

SUMMARY

With the aid of the method according to the present invention, the coefficient of friction between a vehicle wheel and the roadway may be ascertained during the trip. In order to generate conditions, which allow the coefficient of friction to be ascertained at a high accuracy, the longitudinal wheel force at at least one vehicle wheel, at which the current coefficient of friction is to be ascertained, is increased, and/or the contact patch force acting upon this vehicle wheel is reduced. The currently utilized coefficient of friction at the vehicle wheel is calculated from the ratio of the longitudinal wheel force to the contact patch force of the wheel; an increase in the longitudinal wheel force and/or a reduction in the contact patch force of the wheel accordingly producing an increase in the actual, currently utilized coefficient of friction, which is to be ascertained with the aid of the method of the present invention. The maximum available coefficient of friction may be estimated on the basis of the actual, currently used coefficient of friction. In particular, in stable driving situations, the actual coefficient of friction currently used lies below the maximum available coefficient of friction. However, in unstable driving situations, the forces acting at the vehicle wheel in the longitudinal and transverse directions are so high, that they are no longer transmitted to the roadway in a friction-locked manner.

The longitudinal wheel force is increased and/or the contact patch force of the wheel is decreased automatically and without driver manipulation, by automatically controlling at least one active vehicle unit influencing the longitudinal dynamics of the vehicle.

The actual coefficient of friction currently used is ascertained at the vehicle wheel, using increased longitudinal wheel force and/or reduced contact patch force of the wheel, and calculated, for example, from sensor data of a wheel speed sensor. Due to the increased longitudinal wheel force and/or decreased contact patch force of the wheel, this vehicle wheel moves in a higher range of the wheel slip/friction coefficient curve, which allows a more precise determination of the maximum available coefficient of friction.

In the method of the present invention, the characteristic of the sum of all of the longitudinal forces acting upon the vehicle is kept unchanged, while the longitudinal wheel force is increased and/or the contact patch force of the wheel is decreased at at least one vehicle wheel. The sum of the longitudinal forces acting upon the vehicle is made up of various internal and external forces, in particular, of motive forces of the engine, braking forces in the brake system of the vehicle, air resistance forces, rolling friction forces and engine drag torques. Since the current characteristic of the sum of the longitudinal forces acting upon the vehicle is kept unchanged, while the longitudinal wheel force is increased and/or the contact patch force is decreased at the at least one vehicle wheel, the subjective perception of the dynamic driving response of the vehicle does not change for the driver. Therefore, the changing of the force at the at least one vehicle wheel for the improved determination of the maximum available coefficient of friction remains unnoticed by the driver. Consequently, fright reactions of the driver, which may be caused by interventions in the driving dynamics that occur unexpectedly and are perceptible by the driver, are ruled out. On the contrary, the characteristic of the longitudinal forces meets the expectation of the driver.

In order to keep the characteristic of the sum of all of the longitudinal forces acting upon the vehicle unchanged, it may be useful to automatically control at least two active vehicle units influencing the longitudinal dynamics of the vehicle, for example, at least two different brake units, each at one vehicle wheel, or at least one drive unit for driving one or more vehicle wheels, and at the same time, one or more brake units for decelerating one or more vehicle wheels. By simultaneously controlling a plurality of active vehicle units, a compensating effect is achieved, through which the characteristic of the sum of all of the longitudinal forces acting upon the vehicle is maintained, which would set in without the automatic intervention in the vehicle units.

The sum of all of the longitudinal forces acting upon the vehicle may optionally be held constant. This is the case, in particular, while traveling at a constant speed, regardless of whether the vehicle travels in a straight line or in a curve, on a level roadway, steep or ascending roadway. In a further variant, the sum of all of the longitudinal forces acting upon the vehicle assumes a constant characteristic during the determination of the coefficient of friction. In this connection, variants, in which the sum of the longitudinal forces increases or decreases, are also considered; continuity advantageously prevailing in the increasing or decreasing characteristic of the longitudinal forces.

In one alternative variant, however, it is also possible to provide a discontinuous characteristic of the sum of all of the longitudinal forces acting upon the vehicle, while the coefficient of friction currently used is ascertained at the vehicle wheel, at which the longitudinal force is increased and/or the normal force is decreased. A discontinuous characteristic of the sum of all of the longitudinal forces acting upon the vehicle may be generated, for example, in the event of a jerk produced by a braking action independent of the driver; the jerk being generated, for example, as a warning jerk in the case of dangerous situation.

The coefficient of friction at the vehicle wheel, whose longitudinal wheel force is increased and/or whose contact patch force is reduced, is advantageously ascertained within the time interval of increasing the longitudinal wheel force and/or decreasing the contact patch force of the wheel. During this time interval, the vehicle wheel in question has a high dynamic response. Alternatively, it may also be useful for the time interval of the determination of the coefficient of friction currently used to follow the completion of the increase of the longitudinal wheel force and/or the decrease of the contact patch force of the wheel; or for the time interval of the determination of the current coefficient of friction to extend over a portion of or over the entire time interval of the increase of the longitudinal wheel force and/or of the decrease of the contact patch force of the wheel, as well as to the time interval following this. In the time interval, which follows the increase of the longitudinal wheel force and/or decrease of the contact patch force of the wheel, the longitudinal wheel force and the contact patch force at this vehicle wheel are advantageously constant.

Both deceleration of and driving of the at least one vehicle wheel are considered for changing the wheel forces at the vehicle wheel in question. It is possible, for example, to decelerate or to accelerate the two vehicle wheels on a common vehicle axle, in particular, in the same manner, in order to maintain a symmetric force distribution to the two vehicle wheels of this axle. Thus, it is possible, for example, to apply a braking torque to the two rear wheels of a motor vehicle and simultaneously generate a drive torque at the two front wheels of the motor vehicle, in order to keep the speed of the vehicle constant or to set a speed characteristic, which ensures the characteristic of the sum of all of the longitudinal forces acting upon the vehicle, which would also prevail without the automatically executed, driving and braking intervention at the vehicle axles.

Both steady-state and/or quasi-steady-state and dynamic driving conditions are considered for ascertaining the coefficient of friction currently used. In steady-state driving conditions, the vehicle travels, for example, at a constant speed on a level, declining or ascending roadway; both straight-ahead travel and cornering being considered. In dynamic events, in particular, the vehicle speed is decreased or increased. A change in the steering angle is also considered as a driving dynamics state change.

For example, a warning jerk may be generated as a dynamic event, by decelerating a subset of the vehicle wheels, in particular, the wheels at the rear axle of the vehicle; as an option, all of the vehicle wheels also being able to be decelerated. In this manner, the longitudinal wheel forces at the decelerated vehicle wheels increase, which aids in estimating the maximum available coefficient of friction. If, for example, only the vehicle wheels at the rear axle are decelerated, in order to generate a warning jerk, and without a controlling action of, for example, an anti-lock braking system taking place, then it may be concluded that approximately twice the deceleration of the warning-jerk deceleration is possible, using the coefficient of friction currently utilized as a baseline. However, if an action of a vehicle control system, such as an anti-lock braking system, takes place, then the maximum deceleration of the vehicle is reached and is known for subsequent braking actions. If a warning-jerk deceleration is carried out at a vehicle wheel, without a controlling action, such as by an anti-lock braking system, taking place, then approximately quadruple the overall acceleration of the warning-jerk acceleration may be achieved on the vehicle plane.

On the whole, ranges of wheel slip/coefficient of friction curves, which aid in an estimation of the coefficient of friction, may be reached, by actively distributing the wheel forces applied to a vehicle wheel or a plurality of vehicle wheels during the warning jerk.

A further dynamic driving situation includes a desired deceleration of the vehicle, for example, during a trip on the highway at high vehicle speeds, and the utilization of running resistances, which include the air resistance, the rolling friction, as well as the engine drag torque. Such driving situations may purposely be brought about by the driver, in order to decrease the vehicle speed comfortably and, for example, to catch up to preceding, slower vehicles or to retain speed on downhill grades. In these driving situations, the expected, total deceleration generated by the running resistances is simulated by applying a drive torque to a subset of the vehicle wheels and a braking torque to another subset of the vehicle wheels. Thus, for example, a drive torque may be applied to the two vehicle wheels of the front axle and a braking torque may be applied to the two wheels of the rear axle; the drive and braking torques being coordinated with each other in such a manner, that their sum corresponds to the entirety of the running resistances without such drive and braking torques. During a selected time span, in which the drive torque and the braking torque are active, the coefficient of friction currently used may be ascertained with the aid of one or more vehicle wheels, to which a braking torque is applied.

During cornering, for example, the rear wheel on the inside of the curve may be decelerated, in order to increase the longitudinal wheel force at this wheel. In addition, the combined pitch and roll motion of the vehicle generated in doing this will reduce the contact patch force at the rear vehicle wheel on the inside of the curve. As a further effect, the steering operation through the curve is assisted by the yawing torque generated. An additional gain in comfort is achieved, since the steering effort decreases for the driver.

The yawing torque generated by the braking action at an individual vehicle wheel, in particular, during cornering, may optionally be compensated for by an active vehicle unit, such as torque vectoring or an active differential lock. In this case, the braking action may also be carried out in an amplified manner.

After the determination of the coefficient of friction currently used is completed by automatic activation of one or more vehicle units, which influence the driving dynamics of the vehicle, the automatically executed intervention in the vehicle units may be withdrawn partially or completely to the extent, that the forces acting upon the vehicle have the characteristic, which they would have had without automatic activation of one or more vehicle units.

The method is executed automatically by controlling one or more active vehicle units, in particular, a brake unit, a drive unit, a steering unit, a torque vectoring system, an active differential lock or an active suspension unit. An action by the driver is not necessary for executing the method. After the coefficient of friction is determined, the interventions in the at least one active vehicle unit are advantageously withdrawn again, in order to restore the original driving state.

The present invention also relates to a control unit for executing the method described above. The different method steps, in particular, the generation of actuating signals for controlling the at least one active vehicle unit influencing the longitudinal dynamics, are generated in the control unit as a function of input signals, which are, in particular, sensor signals that are used for ascertaining the coefficient of friction currently used, for example, wheel speed data. The present invention further relates to a vehicle including such a control unit and one or more active vehicle units for influencing the longitudinal dynamics of the vehicle.

Furthermore, the present invention relates to a computer program product including program code, which is designed to execute the method steps described above. The computer program product runs in a control unit described above.

Further advantages and useful variants may be deduced from the further claims, the description of the figures, and the drawing, in which two diagrams including the curve of running resistances at a motor vehicle with respect to time, as well as the curve of the longitudinal slip at the vehicle wheels, are represented.

BRIEF DESCRIPTION OF THE DRAWING

FIG. 1 shows two graphs representing a trip at initially constant speed in a vehicle, with manipulation of the accelerator pedal for generating a drive torque during a first phase, and a subsequent phase without a drive torque, to allow the vehicle to roll without propulsion.

DETAILED DESCRIPTION

The two graphs stand for a trip at initially constant speed in a vehicle, with manipulation of the accelerator pedal for generating a drive torque during a first phase, and a subsequent phase without a drive torque, in order to allow the vehicle to roll without propulsion. In the period of time between 0 and $t_1$, the vehicle initially still travels, using a constant drive torque, which the driver selects by manipulating the accelerator pedal. At time $t_1$, the driver goes from the accelerator pedal and ends the manipulation of the accelerator pedal, with the intention of allowing the vehicle to roll without applying a drive torque. If no active vehicle unit influencing the longitudinal dynamics of the vehicle is automatically controlled, then running resistance $M_W$, which includes the air resistance, the rolling friction, as well as the engine drag torque, acts upon the vehicle. Based on his/her experience, the driver expects a torque characteristic in accordance with running resistance $M_W$.

The characteristic of running resistance $M_W$ may be simulated by simultaneously applying a drive torque $M_A$ to the vehicle wheels of the front axle and a braking torque $M_B$ to the vehicle wheels of the rear axle. This takes place for the purpose of generating an increased longitudinal wheel force at the vehicle wheels of the rear axle, the increased longitudinal wheel force being advantageous for ascertaining the currently utilized coefficient of friction at the vehicle wheels of the rear axle. By reducing the speed of the vehicle, the load on the rear axle is additionally removed, which means that the contact patch force at the vehicle wheels of the rear axle is reduced, which is also advantageous in view of the determination of the currently utilized coefficient of friction at the wheels of the rear axle.

The coefficient of friction at a wheel is generally calculated from $$\mu_{act} = \frac{F_x}{F_N}.$$

In this, $\rho_{act}$ denotes the coefficient of friction currently used, $F_x$ denotes the longitudinal wheel force, and $F_N$ denotes the contact patch force of the wheel. Accordingly, the coefficient of friction currently used $\mu_{act}$ increases when longitudinal wheel force $F_x$ is increased and/or contact patch force $F_N$ of the wheel is decreased. During a stable trip, the coefficient of friction currently used $\mu_{act}$ is below the maximum possible coefficient of friction.

Since, between times $t_1$ and $t_2$, longitudinal wheel force $F_x$ is increased and contact patch force $F_N$ of the wheel is reduced at least slightly, then on the whole, the currently utilized coefficient of friction $\mu_{act}$ at the vehicle wheels of the rear axle is increased, and consequently, a higher percentage of the maximum coefficient of friction is already utilized. This facilitates and improves the determination of the maximum coefficient of friction; prediction of the maximum coefficient of friction is made easier. Using this information, for example, driver assistance systems, such as an electronic stability program or the like, may be parameterized.

In the time between $t_1$ and $t_2$, torque characteristic $M_W$, which represents the totality of the running resistances, is yielded from the sum of drive torque $M_A$ automatically applied to the front axle and braking torque $M_B$ automatically applied to the rear axle. This means that the driver does not perceive any of the automatic intervention in the brake and drive systems of the vehicle.

During the increase of engine drive torque $M_A$ at the wheels of the front axle, in the interval between times $t_1$ and $t_2$, longitudinal slip $\lambda_{FA}$ at the front axle wheels correspondingly increases, as well. Due to the braking torque $M_B$ applied to the wheels of the rear axle, a negative longitudinal slip $\lambda_{RA}$ is generated there.

At time $t_2$, the automatic intervention in the drive system and the brake system is ended, so that the vehicle continues to roll without a drive torque and without a braking torque. The forces and torques acting upon the vehicle are yielded from the entirety of the running resistances $M_W$ for the air resistance, the rolling friction and the engine drag torque and also correspond to the characteristic subjectively expected by the driver, just as in the preceding time interval between times $t_1$ and $t_2$; the transition in the phase between $t_1$ and $t_2$, which includes the automatic intervention in the drive and braking systems, and also the transition into the following phase subsequent to time $t_2$, proceeding continuously. Through this, it is ensured that at both the automatic activation of the drive and braking systems at time $t_1$ and the automatic deactivation of the drive and braking systems at time $t_2$, the forces acting upon the vehicle have the expected characteristic, so that the activation and deactivation are not perceived by the driver.

What is claimed is:

1. A method for ascertaining a coefficient of friction between a vehicle wheel and a roadway, the method comprising:
controlling, during a trip, at least one active vehicle unit influencing longitudinal dynamics of the vehicle so that a longitudinal wheel force acting upon at least one vehicle wheel is increased, and/or a contact patch force acting upon the at least one vehicle wheel is decreased, while a characteristic of a sum of all longitudinal forces acting upon the vehicle remains unchanged, and
determining an actual coefficient of friction currently used from the longitudinal wheel force and the contact patch force of the wheel;
wherein the coefficient of friction at a wheel is calculated from $$\mu_{act} = \frac{F_x}{F_N},$$

where $\mu_{act}$ is the coefficient of friction currently used, $F_x$ is the longitudinal wheel force, and $F_N$ is the contact patch force of the wheel, so that the coefficient of friction currently used $\mu_{act}$ increases when the longitudinal wheel force $F_x$ is increased and/or the contact patch force $F_N$ of the wheel is decreased, so that during a stable trip, the coefficient of friction currently used $\mu_{act}$ is below a maximum possible coefficient of friction,
  wherein at an automatic activation of drive and braking systems at a first time and at an automatic deactivation of the drive and braking systems at a second time, the forces acting upon the vehicle have the expected characteristic of the sum of all the longitudinal forces acting upon the vehicle, so that the activation and deactivation are not perceived by the driver,
  wherein between times $t_1$ and $t_2$, the longitudinal wheel force $F_x$ is increased and the contact patch force $F_N$ of the wheel is reduced at least slightly, so that the currently used coefficient of friction $\mu_{act}$ at the vehicle wheels of the rear axle is increased, and consequently, a higher percentage of the maximum coefficient of friction is used, so as to improve a prediction of the maximum coefficient of friction, and
  wherein a time between $t_1$ and $t_2$, a torque characteristic, which represents a totality of running resistances, is obtained automatically from a sum of a drive torque automatically applied to a front axle and a braking torque automatically applied to a rear axle, so that the driver does not perceive any of the automatic intervention in the drive and braking systems of the vehicle.

2. The method as recited in claim 1, wherein the coefficient of friction is ascertained in a time interval of increasing the longitudinal wheel force acting upon the at least one vehicle wheel and/or decreasing the contact patch force acting upon the at least one vehicle wheel.

3. The method as recited in claim 1, wherein at least one vehicle wheel is decelerated for ascertaining the coefficient of friction.

4. The method as recited in claim 1, wherein two vehicle wheels on a common vehicle axle are decelerated or accelerated.

5. The method as recited in claim 1, wherein a subset of wheels of the vehicle is decelerated, and a drive torque is applied to another subset of the wheel of the vehicle.

6. The method as recited in claim 1, wherein the sum of all of the longitudinal forces acting upon the vehicle assumes a constant characteristic during the ascertainment of the coefficient of friction.

7. The method as recited in claim 1, wherein the sum of all of the longitudinal forces acting upon the vehicle remains constant during the ascertainment of the coefficient of friction.

8. The method as recited in claim 1, wherein the longitudinal wheel force and/or the contact patch force at at least one vehicle wheel is changed during a trip at a constant or approximately constant speed.

9. The method as recited in claim 1, wherein the longitudinal wheel force and/or the contact patch force at at least one vehicle wheel is changed during an acceleration or braking phase.

10. The method as recited in claim 1, wherein the longitudinal wheel force and/or the contact patch force at at least one vehicle wheel is changed while traveling straight ahead.

11. The method as recited in claim 1, wherein the longitudinal wheel force and/or the contact patch force at at least one vehicle wheel is changed during cornering.

12. An apparatus for controlling a vehicle unit influencing longitudinal dynamics of a vehicle, comprising:
  a control unit configured to ascertain a coefficient of friction between a vehicle wheel and a roadway, by performing the following:
    controlling, during a trip, at least one active vehicle unit influencing longitudinal dynamics of the vehicle so that a longitudinal wheel force acting upon at least one vehicle wheel is increased, and/or a contact patch force acting upon the at least one vehicle wheel is decreased, while an expected characteristic of a sum of all longitudinal forces acting upon the vehicle remains unchanged, and
    determining an actual coefficient of friction currently used from the longitudinal wheel force and the contact patch force of the wheel;
  wherein the coefficient of friction at a wheel is calculated from $$\mu_{act} = \frac{F_x}{F_N},$$

where $\mu_{act}$ is the coefficient of friction currently used, $F_x$ is the longitudinal wheel force, and $F_N$ is the contact patch force of the wheel, so that the coefficient of friction currently used $\mu_{act}$ increases when the longitudinal wheel force $F_x$ is increased and/or the contact patch force $F_N$ of the wheel is decreased, so that during a stable trip, the coefficient of friction currently used $\mu_{act}$ is below a maximum possible coefficient of friction, and
  wherein at an automatic activation of drive and braking systems at a first time and at an automatic deactivation of the drive and braking systems at a second time, the forces acting upon the vehicle have the expected characteristic of the sum of all the longitudinal forces acting upon the vehicle, so that the activation and deactivation are not perceived by the driver,
  wherein between times $t_1$ and $t_2$, the longitudinal wheel force $F_x$ is increased and the contact patch force $F_N$ of the wheel is reduced at least slightly, so that the currently used coefficient of friction $\mu_{act}$ at the vehicle wheels of the rear axle is increased, and consequently, a higher percentage of the maximum coefficient of friction is used, so as to improve a prediction of the maximum coefficient of friction, and
  wherein a time between $t_1$ and $t_2$, a torque characteristic, which represents a totality of running resistances, is obtained automatically from a sum of a drive torque automatically applied to a front axle and a braking torque automatically applied to a rear axle, so that the driver does not perceive any of the automatic intervention in the drive and braking systems of the vehicle.

13. A vehicle, having comprising:
  a control unit; and
  at least one vehicle unit, which is controllable by the control unit and which is configured for influencing longitudinal dynamics of the vehicle;

wherein the control unit is configured to ascertain a coefficient of friction between a vehicle wheel and a roadway, by performing the following:
controlling, during a trip, the at least one active vehicle unit for influencing the longitudinal dynamics of the vehicle so that a longitudinal wheel force acting upon at least one vehicle wheel is increased, and/or a contact patch force acting upon the at least one vehicle wheel is decreased, while a characteristic of a sum of all longitudinal forces acting upon the vehicle remains unchanged, and
determining an actual coefficient of friction currently used from the longitudinal wheel force and the contact patch force of the wheel;
wherein the coefficient of friction at a wheel is calculated from $$\mu_{act} = \frac{F_x}{F_N},$$

where $\mu_{act}$ is the coefficient of friction currently used, $F_x$ is the longitudinal wheel force, and $F_N$ is the contact patch force of the wheel, so that the coefficient of friction currently used $\mu_{act}$ increases when the longitudinal wheel force $F_x$ is increased and/or the contact patch force $F_N$ of the wheel is decreased, so that during a stable trip, the coefficient of friction currently used $\mu_{act}$ is below a maximum possible coefficient of friction, and
wherein at an automatic activation of drive and braking systems at a first time and at an automatic deactivation of the drive and braking systems at a second time, the forces acting upon the vehicle have the expected characteristic of the sum of all the longitudinal forces acting upon the vehicle, so that the activation and deactivation are not perceived by the driver,
wherein between times $t_1$ and $t_2$, the longitudinal wheel force $F_x$ is increased and the contact patch force $F_N$ of the wheel is reduced at least slightly, so that the currently used coefficient of friction $\mu_{act}$ at the vehicle wheels of the rear axle is increased, and consequently, a higher percentage of the maximum coefficient of friction is used, so as to improve a prediction of the maximum coefficient of friction, and
wherein a time between $t_1$ and $t_2$, a torque characteristic, which represents a totality of running resistances, is obtained automatically from a sum of a drive torque automatically applied to a front axle and a braking torque automatically applied to a rear axle, so that the driver does not perceive any of the automatic intervention in the drive and braking systems of the vehicle.

14. A non-transitory computer readable storage medium on which is stored a computer program, which is executable by a control unit having a processor, comprising:
a program code arrangement having program code for ascertaining a coefficient of friction between a vehicle wheel and a roadway, the program code, by performing the following:
controlling, during a trip, at least one active vehicle unit influencing longitudinal dynamics of the vehicle so that a longitudinal wheel force acting upon at least one vehicle wheel is increased, and/or a contact patch force acting upon the at least one vehicle wheel is decreased, while a characteristic of a sum of all longitudinal forces acting upon the vehicle remains unchanged, and
determining an actual coefficient of friction currently used from the longitudinal wheel force and the contact patch force of the wheel;
wherein the coefficient of friction at a wheel is calculated from $$\mu_{act} = \frac{F_x}{F_N},$$

where $\mu_{act}$ is the coefficient of friction currently used, $F_x$ is the longitudinal wheel force, and $F_N$ is the contact patch force of the wheel, so that the coefficient of friction currently used $\mu_{act}$ increases when the longitudinal wheel force $F_x$ is increased and/or the contact patch force $F_N$ of the wheel is decreased, so that during a stable trip, the coefficient of friction currently used $\mu_{act}$ is below a maximum possible coefficient of friction, and
wherein at an automatic activation of drive and braking systems at a first time and at an automatic deactivation of the drive and braking systems at a second time, the forces acting upon the vehicle have the expected characteristic of the sum of all the longitudinal forces acting upon the vehicle, so that the activation and deactivation are not perceived by the driver,
wherein between times $t_1$ and $t_2$, the longitudinal wheel force $F_x$ is increased and the contact patch force $F_N$ of the wheel is reduced at least slightly, so that the currently used coefficient of friction $\mu_{act}$ at the vehicle wheels of the rear axle is increased, and consequently, a higher percentage of the maximum coefficient of friction is used, so as to improve a prediction of the maximum coefficient of friction, and
wherein a time between $t_1$ and $t_2$, a torque characteristic, which represents a totality of running resistances, is obtained automatically from a sum of a drive torque automatically applied to a front axle and a braking torque automatically applied to a rear axle, so that the driver does not perceive any of the automatic intervention in the drive and braking systems of the vehicle.

* * * * *